(12) United States Patent
Li et al.

(10) Patent No.: US 10,489,402 B2
(45) Date of Patent: Nov. 26, 2019

(54) BRIDGING NATIVE JDBC CALLS WITH DBAAS USING ESB

(71) Applicant: International Business Machines Corporation, Armonk, NY (US)

(72) Inventors: Shuo Li, Beijing (CN); Xin Peng Liu, Beijing (CN); Bei Bei Wang, Beijing (CN); Pu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 15/345,925

(22) Filed: Nov. 8, 2016

(65) Prior Publication Data

US 2018/0129706 A1 May 10, 2018

(51) Int. Cl.
*G06F 16/2453* (2019.01)
*G06F 16/2455* (2019.01)

(52) U.S. Cl.
CPC .. *G06F 16/24542* (2019.01); *G06F 16/24553* (2019.01)

(58) Field of Classification Search
CPC ......... G06F 17/30463; G06F 17/30483; G06F 16/24542; G06F 16/24553
See application file for complete search history.

(56) References Cited

U.S. PATENT DOCUMENTS

| | | | |
|---|---|---|---|
| 7,984,043 B1 * | 7/2011 | Waas | G06F 16/8358 707/718 |
| 8,364,745 B2 | 1/2013 | Roshen | |
| 8,701,128 B2 | 4/2014 | Salt et al. | |
| 2001/0044795 A1 * | 11/2001 | Cohen | G06F 17/30699 |
| 2003/0037034 A1 * | 2/2003 | Daniels | G06Q 10/087 |
| 2005/0055357 A1 * | 3/2005 | Campbell | G06F 8/61 |
| 2012/0143634 A1 | 6/2012 | Beyda et al. | |
| 2012/0330991 A1 * | 12/2012 | Babka | G06F 17/30309 707/765 |
| 2014/0278337 A1 * | 9/2014 | Branson | G06F 11/3457 703/22 |
| 2015/0052021 A1 * | 2/2015 | Elias | G06Q 30/0627 705/26.63 |
| 2015/0081866 A1 * | 3/2015 | Cohen | H04L 69/03 709/223 |

(Continued)

OTHER PUBLICATIONS

Santiago Gómez Sáez, "Extending an Open Source Enterprise Service Bus for Cloud Data Access Support", Diploma Thesis No. 3419, University of Stuttgart, Mar. 22, 2013, 123 pages. <http://www.iaas.uni-stuttgart.de/institut/mitarbeiter/gomez/res/DIP_3419.pdf>.

(Continued)

*Primary Examiner* — Jay A Morrison
(74) *Attorney, Agent, or Firm* — Patterson + Sheridan, LLP (57) ABSTRACT

Methods and apparatus are provided for receiving a database query and executing the query against a remote database. The database query is used to generate an execution sequence comprising HTTP requests and data processing operations based on the database query. The HTTP requests are sent to a RESTful API provided by a database system. The HTTP requests are executed by the database system against a database, and the responses from the database system are returned to be processed according to the data processing operations. Finally, a set of query results is returned to the sender of the original database query.

16 Claims, 5 Drawing Sheets

(56) References Cited

U.S. PATENT DOCUMENTS

2015/0169686 A1* 6/2015 Elias ................. G06F 17/30463
707/718
2017/0139956 A1* 5/2017 Qiao ....................... H04L 67/02
2017/0372200 A1* 12/2017 Chen ......................... G06N 3/08

OTHER PUBLICATIONS

Christoph Schmid, "Development of a Java Library and Extension of a Data Access Layer for Data Access to Non-Relational Databases", Diploma Thesis No. 3679, University of Stuttgart, Dec. 19, 2014, 109 pages. <http://d-nb.info/106910647X/34>.
Sáez, et al., "Evaluating Caching Strategies for Cloud Data Access Using an Enterprise Service Bus", IEEE International Conference on Cloud Engineering, Mar. 11-14, 2014, (abstract only). <http://ieeexplore.ieee.org/document/6903465/?tp=&arnumber=6903485&url=http:%2F%2Fieeexplore.ieee.org%2Fxpls%2Fabs_all.jsp%3Farnumber%3D6903485>.

* cited by examiner

BRIDGING NATIVE JDBC CALLS WITH DBAAS USING ESB

BACKGROUND

The present disclosure generally relates to the field of database access and, more particularly, to systems and methods for using an enterprise service bus to bridge a legacy relational database management system and a database as a service system.

Legacy systems are often designed to access a relational database management system (RDBMS) through database calls, often formatted in structured query language (SQL). Database as a Service (DBaaS) offers increased flexibility and scalability over traditional databases, as the database is stored in the cloud and can be readily accessed. Because of structural differences between traditional RDBMS and DBaaS, systems which use queries for RDBMS will almost certainly fail to operate correctly if they are instead attached to a DBaaS.

Recently, many systems which are implemented through a RDBMS have been migrated to a DBaaS system in order to achieve the flexibility and scalability discussed above. To achieve this change, legacy systems sometimes undergo time-consuming and expensive rewrites and edits in order to interface with the DBaaS. Such extensive changes are difficult to accomplish, and prone to error.

In order to avoid changing the substantive queries in legacy systems while achieving a migration to a DBaaS, many have turned to an enterprise service bus (ESB) to bridge the gap. Such implementations, however, have required similarly extensive effort to manually translate the legacy queries into a form recognized by the DBaaS. These efforts, as discussed above, are time-consuming and error prone. Moreover, the resulting ESB is able to bridge the gap between a single legacy system and a single DBaaS, and subsequent changes to the DBaaS require additional extensive changes to the ESB. Furthermore, the ESB must be configured with different logic for each of the legacy systems that need DBaaS access.

SUMMARY

According to one embodiment of the present invention, a database query is received from a legacy system and the ESB is configured to generate an execution sequence for this database query. The execution sequence maps the steps in the query plan to HTTP requests and data processing operations. The ESB sends these HTTP requests to the DBaaS system, which provides a RESTful interface. Once the results of the HTTP requests are received by the ESB, they are processed using the data processing operations of the execution sequence in order to generate a set of query results corresponding to the initial database query. Finally, these results are sent to the legacy system.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Existing solutions to migrate legacy systems that require database access to DBaaS have proven to be time-consuming, error prone, and expensive. As such, embodiments described herein provide techniques for bridging native database calls with a DBaaS through an ESB in an improved way. In one embodiment, a database query is received from a legacy system and the ESB is configured to generate a query plan based on this database query. The ESB also generates an execution sequence based on this query plan. The execution sequence maps the steps in the query plan to HTTP requests and data processing operations. The ESB sends these HTTP requests to the DBaaS system, which provides a RESTful interface. Once the results of the HTTP requests are received by the ESB, they are processed using the data processing operations of the execution sequence in order to generate a set of query results corresponding to the initial database query. Finally, these results are sent to the legacy system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the DBaaS) or related data available in the cloud. For example, the DBaaS and/or ESB Component could execute on a computing system in the cloud and provide transparent access to the database. In such a case, the ESB and DBaaS could reside on the cloud and store the database information at a storage location in the cloud. Doing so allows a user to access this information from any computing system attached to a network connected to the cloud (e.g., the Internet).

Figure 1:
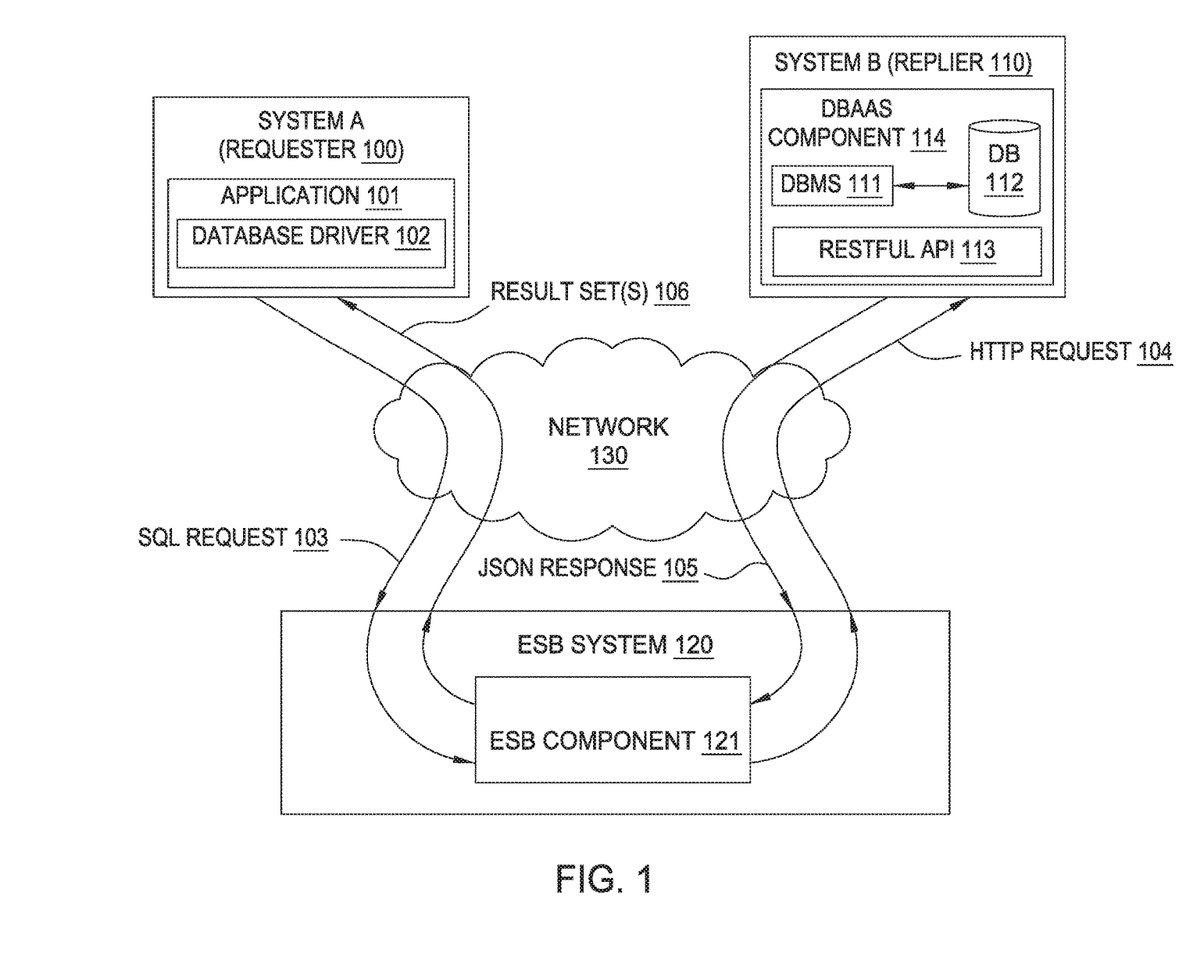
FIG. 1 depicts one architecture of a system configured with an ESB component, according to one embodiment described herein.

FIG. 1 depicts one architecture of a system within which embodiments of the present invention may be implemented. Requester 100 is a legacy system that was designed for database queries to a legacy database. For example, Requester 100 may be designed to use Java Database Connectivity (JDBC), which is oriented towards relational databases, in order to query an associated database. Replier 110 comprises a DBaaS Component 114, which provides DBaaS functionality, and provides a Restful API 113 through which queries can be submitted. Requester 100 is running an Application 101, which has a Database Driver 102. The Database Driver 102 is configured to intercept all database queries from Application 101, which were originally intended to be executed directly against a database, and reroutes them to ESB System 120 in order to bridge the gap to the Replier 110. The SQL Requests 103 are sent by Database Driver 102 through a Network 130 to ESB System 120. Network 130 could be a wireless network or could be a wired connection. Additionally, in some embodiments, ESB System 120 may in fact be on the same device as Requester 100. Network 130 also links ESB System 120 to Replier 110. As above, Replier 110 may in fact be on the same system as ESB System 120, and Network 130 may simply be the connection between these disparate modules.

ESB System 120 comprises ESB Component 121 which handles incoming requests, as will be discussed in more detail below. After processing the SQL Requests 103, ESB Component 121 sends one or more HTTP Requests 104 through Network 130 to Replier 110. More specifically, HTTP Requests 104 are sent to a RESTful API 113 residing on Replier 110. RESTful API 113 is a well-known module in the art that provides access to the underlying resources through GET, PUT, POST, and DELETE HTTP Requests 104. Of course, although the illustrated embodiment uses a RESTful API, Replier 110 could provide any interface capable of the functions and characteristics disclosed herein.

After receiving HTTP Requests 104 through RESTful API 113, DBaaS Component 114 executes the HTTP Requests 104 on Database 112 using Database Management System (DBMS) 111. Generally, a "GET" HTTP Request 104 is used to search in the Database 112, a "POST" HTTP Request 104 is used to insert data into Database 112, a "PUT" HTTP Request 104 is used to update data in the Database 112, and a "DELETE" HTTP Request is used to delete data from the Database 112. As discussed above, however, any type of HTTP Request 104 could be used for each respective function of DBMS 111, and the present invention is not limited by the disclosure in FIG. 1.

In one embodiment, DBaaS Component 114 sends one or more JavaScript Object Notation (JSON) objects through Network 130 to ESB System 120. These JSON Responses 105 could be data from Database 112, or any other appropriate response based on the content of the corresponding HTTP Request 104. ESB System 120, and more particularly ESB Component 121, receives the JSON Responses 105. ESB Component 121 may optionally perform transformations or operations on the JSON Responses 105 before sending them to Requester 100, as will be discussed in more detail below. After JSON Responses 105 have been formatted and manipulated as required by the corresponding SQL Request 103, ESB Component 121 sends one or more Result Sets 106 back to Requester 100. In some embodiments, Result Sets 106 are formatted as JSON objects and Database Driver 102 reformats them as SQL Result Queries before returning them to Application 101. In this way, ESB System 120 is transparent to Application 101, as Application 101 simply sends an SQL Request 103 and receives a SQL result set without knowing the underlying architecture. This allows migration to newer DBaaS without modifying the existing legacy systems. In some embodiments, however, ESB Component 121 formats the Result Sets 106 as SQL result sets before sending them to Database Driver 102, and Database Driver 102 simply provides these result sets to Application 101 without modification. Such an embodiment has the advantage of requiring fewer resources from Requester 100, but may require some additional system-specific programming on the ESB Component 121, which may cause it to be slightly less flexible.

Figure 2:
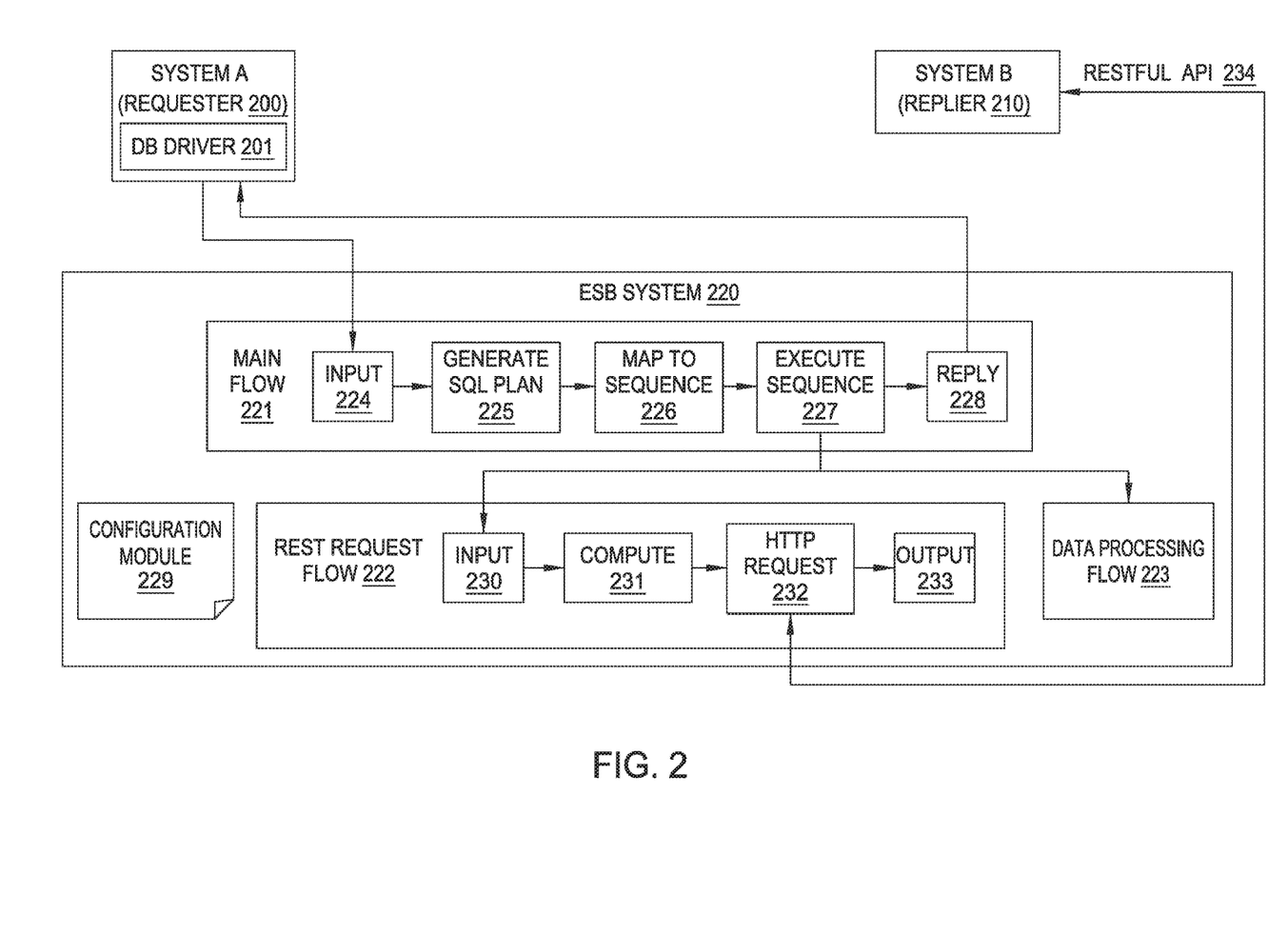
FIG. 2 depicts a flow diagram for executing an SQL query against a database system that provides a RESTful API, according to one embodiment described herein.

FIG. 2 depicts the steps and components involved in one embodiment of the present invention in more detail. As above, Requester 200 is a legacy system that is designed to interface with a database, and DB Driver 201 intercepts database queries on Requester 200 to be sent to ESB System 220. In order to better understand the functioning of the ESB System 220 in one embodiment of the present disclosure, FIG. 2 illustrates a series of flows that generally describe the process a SQL Request 103 goes through according to one embodiment described herein. As shown, the flows include Main Flow 221, REST Request Flow 222, and Data Processing Flow 223. Of course, the depiction of these flows is shown for illustrative purposes only and without limitation.

As shown, SQL Requests 103 are received from the DB Driver 201 and are communicated to Input 224 in the Main Flow 221. Upon receiving an SQL request, the ESB component 121 generates an SQL Plan for use in executing the SQL request (block 225). For example, such an SQL Plan may be represented as a tree-like structure comprising an ordered sequence of operations that should be performed in order to execute a database query fully. For example, a single SQL Query could require multiple fetches, joins, sorts, and other operations in order to generate the corresponding result set. Upon generating the SQL Plan, the ESB Component 121 maps the operations within the SQL plan to an execution sequence (block 226). During this generation process, the ESB Component 121 could classify each of the ordered operations of the query plan and could map the operation to either an HTTP Request which will carry out an operation on the Database, or a data processing/transformation operation which does not access the database but instead transforms data received from the database. For example, a "fetch" step in the query plan would be mapped and translated into a corresponding HTTP Request, whereas a "join" or "sort" operation would be translated and mapped to a corresponding Data Processing operation.

In some embodiments, the legacy database may use a different database schema than the corresponding DBaaS that replaces it. Table names, column names, row names, and the like may have been changed in the new DBaaS system. For example, legacy software may expect a "Children" table with a "Name" column, but the equivalent DBaaS table may be named "Students," and/or the equivalent column may be "FullName." In order to facilitate access, some embodiments include a Configuration Module 229, which is used to map the legacy queries to the new names. Continuing the above example, a user may optionally use an editor to configure the Configuration Module 229 to indicate that queries accessing the "Children" table should be mapped to the "Students" table, and that references to "Children.Name" should be replaced with "Students.FullName." In this way, Configuration Module 229 provides additional flexibility by allowing tables, columns, and rows to be renamed as needed, while retaining the automated benefits of the present disclosure. The Configuration Module 229 can easily and quickly be adjusted as needed, avoiding the intensive and difficult work needed by prior systems. In such an embodiment, the ESB Component 121 may access the Configuration Module 229 upon receiving a query at block Input 224, while generating the SQL plan at block 225, or during the generation of the execution sequence at block 226, or at any other time prior to actually sending the HTTP request to the Replier 210.

Once the execution sequence is generated, the ESB Component 121 executes the sequence of operations (block 227). The operations performed by the ESB Component 121 in executing the sequence, according to the depicted embodiment, are shown in REST Request Flow 222 and Data Processing Flow 223. ESB Component 121 takes each HTTP Request 104 (block 230) and performs any computation or transformation necessary to comply with a RESTful interface (block 231). ESB Component 121 also sends each of the HTTP Requests 104 to the Replier 210 system through the RESTful API 234 (block 232), and the database software of the Replier 210 executes them against the database. The responses from the Replier 210 system are Output 233 from the REST Request Flow 222, and are used in the Data Processing Flow 223 along with the aforementioned Data Processing Operations. The ESB Component 121 then performs the specified operations or transformations on the responses from the database such that the SQL Query is fulfilled. For example, the ESB Component 121 may join two fetch results together, sort a set of results, or any other known database operations.

Finally, after all HTTP Requests and Data Processing Operations have been completed, the ESB Component 121 sends the subsequent result set back to the Requester 200 system. As discussed above, this allows applications running on the Requester 200 system to access the database seamlessly and transparently, and without requiring any substantive change to the underlying legacy system.

Figure 3:
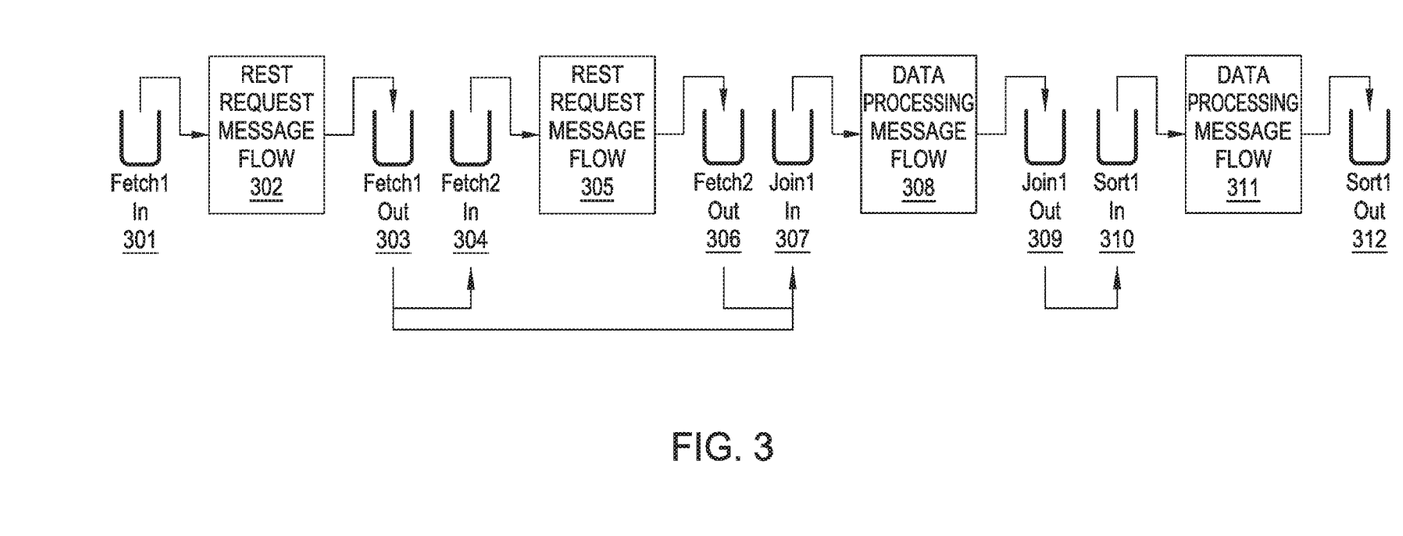
FIG. 3 depicts an execution sequence of a database query, according to one embodiment described herein.

FIG. 3 illustrates an example execution sequence in one embodiment of the present invention. The illustrated execution sequence was generated based on the following SQL Query: "SELECT*FROM Student, Score WHERE Student.SID=Score.SID AND Student.Dept='CS' AND Score.Course='2' ORDER BY Score.Grade DESC". This query is written to executed against a traditional database with the following tables:

| Database Table 1 - Student | | | |
|---|---|---|---|
| SID | Name | Age | Dept |
| 1001 | Alice | 20 | CS |
| 1002 | Bob | 19 | CS |
| 1003 | Carla | 18 | MA |
| 1004 | Dave | 19 | IS |

| Database Table 2 - Score | | |
|---|---|---|
| SID | Course | Grade |
| 1001 | 1 | 92 |
| 1001 | 2 | 85 |
| 1001 | 3 | 88 |
| 1002 | 2 | 90 |
| 1002 | 2 | 80 |

Executing this SQL query against the database results in the following result set:

| Data Set 1 - Query Result Set | | | | | |
|---|---|---|---|---|---|
| SID | Name | Age | Dept | Course | Grade |
| 1002 | Bob | 19 | CS | 2 | 90 |
| 1001 | Alice | 20 | CS | 2 | 85 |

This query results in a query plan which comprises a "Sort" operation whose input is a "Join" operation. The "Join" operation has as input a "Fetch" operation from the "Student" table and a "Fetch" operation from the "Score" table. In the example embodiment, each of these operations is assigned an "In" queue and an "Out" queue, and the various data transmission routes are generated as well based on the query plan. As can be seen in FIG. 3, Fetch1 In 301 comprises an HTTP Request (REST Request Message Flow 302) which sends an HTTP Request to the Replier 210 and receives a response back, which is represented by Fetch1 Out 303. The query results can be seen below:

| Data Set 2-Fetch Results | | |
|---|---|---|
| [{ <br> "SID": "1001", <br> "Name": "Alice", <br> "Age": 20, <br> "Dept": "CS" <br> }, { <br> "SID": "1002" <br> "Name": "Bob", <br> "Age": 19, <br> "Dept": "CS" <br> }] | [{ <br> "SID": "1001", <br> "Course": "2", <br> "Grade": "85" <br> }] | [{ <br> "SID": "1002", <br> "Course": "2", <br> "Grade": "90" <br> }] |

The results of REST Request Message Flow 302 flow into Joint In 307 for the later join operation, and are also sent to Fetch2 In 304 in order to satisfy the SQL query above. The REST Request Message Flow 305 satisfies the other "Fetch" operation, and the results are sent to Fetch2 Out 306 before being forwarded to Join1 In 307, along with the fetch results from the other table. Join1 In 307 leads to Data Processing Message Flow 308, which joins the two fetches into a single set and puts it to Join1 Out 309. Join1 Out 309 likewise is connected to Sort1 In 310 which sends the resulting joined data set to Data Processing Message Flow 311 to be sorted. Finally, Sort1 Out 312 contains the ultimate result of the execution sequence, which corresponds to the original SQL query. The joined and sorted query can be seen below:

Data Set 3-Joined and Sorted Query Results

```
{
    "SID": "1002"
    "Name": "Bob",
    "Age": 19,
    "Dept": "CS",
    "Course": "2",
    "Grade": "90"
}, {
    "SID": "1001",
    "Name": "Alice",
    "Age": 20,
    "Dept": "CS",
    "Course": "2",
    "Grade": "85"
}]
```

Figure 4:
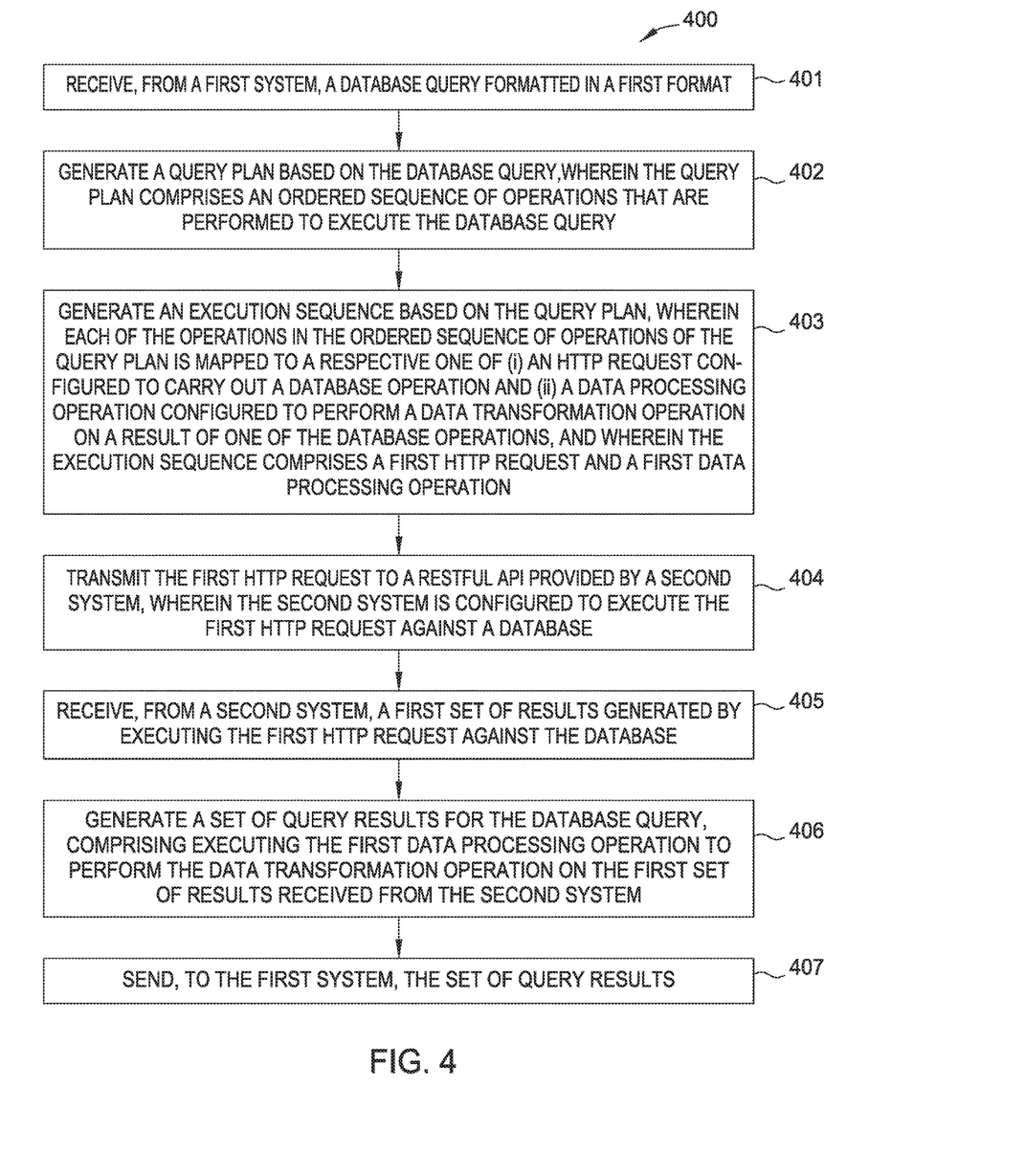
FIG. 4 depicts a flow diagram for a method of executing a query against a database system that provides a RESTful API, according to one embodiment described herein.

FIG. 4 illustrates a flowchart of a method 400 which implements one embodiment of the present invention. The method 400 begins at block 401, where the ESB Component 121 receives, from a first system, a database query formatted in a first format. At block 402, the ESB Component 121 generates a query plan based on the database query, wherein the query plan comprises an ordered sequence of operations that are performed to execute the database query. At block 403, the ESB Component 121 generates an execution sequence based on the query plan, wherein each of the operations in the ordered sequence of operations of the query plan is mapped to a respective one of (i) an HTTP request configured to carry out a database operation and (ii) a data processing operation configured to perform a data transformation operation on a result of one of the database operations, and wherein the execution sequence comprises a first HTTP request and a first data processing request.

The method 400 continues at block 404 where the ESB Component 121 transmits the first HTTP request to a RESTful API provided by a second system, wherein the second system is configured to execute the first HTTP request against a database. At block 405, the ESB Component 121 receives, from the second system, a first set of results generated by executing the first HTTP request against the database. The ESB Component 121, at block 406, generates a set of query results for the database query, comprising executing the first data processing operation to perform the data transformation operation on the first set of results received from the second system. Finally, the method 400 ends at block 407 where the ESB Component 121 sends, to the first system, the set of query results.

Figure 5:
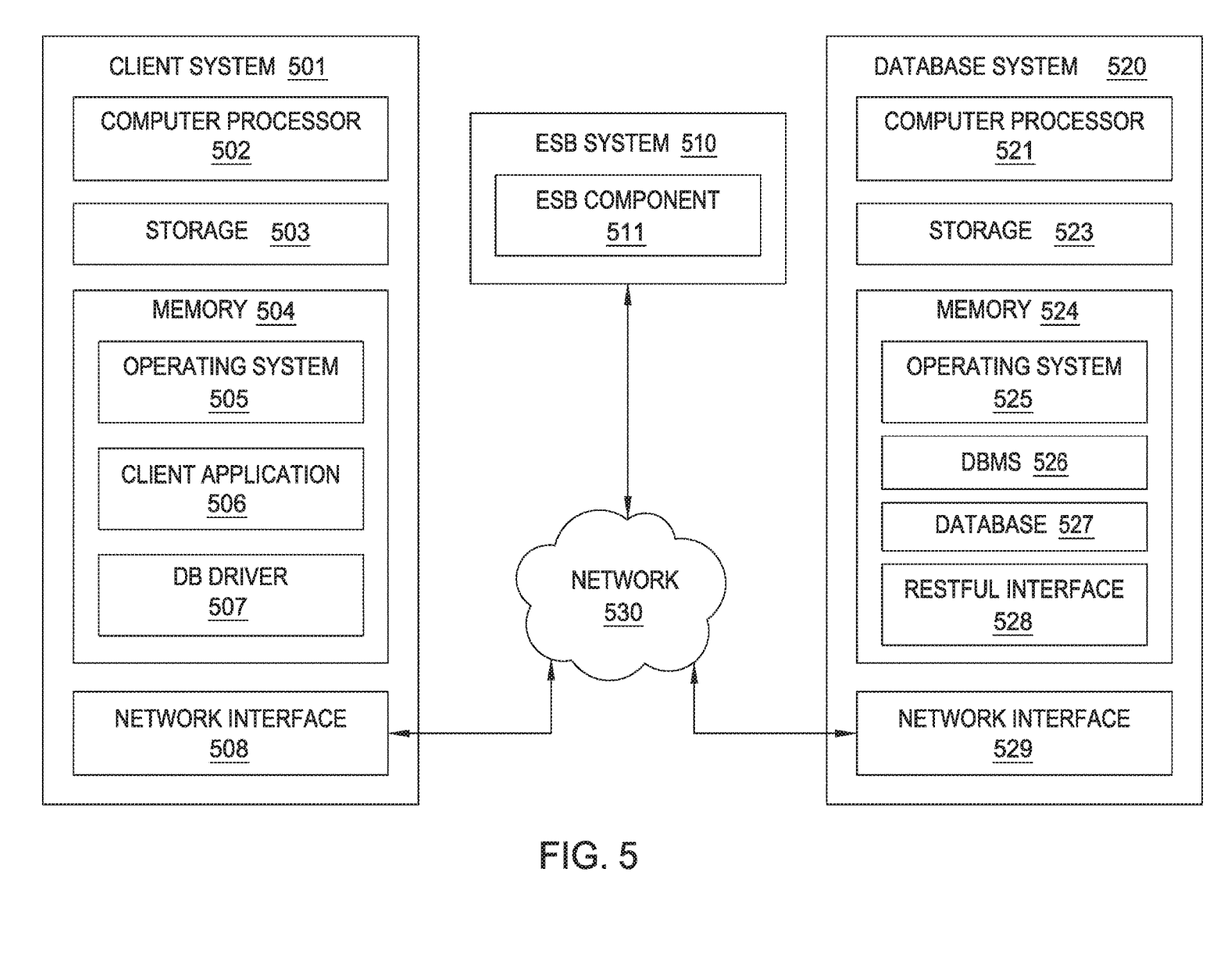
FIG. 5 is a block diagram depicting an architecture of a system configured with an ESB component, according to one embodiment described herein.

FIG. 5 is a block diagram illustrating one architecture of a system within which embodiments of the present invention may be implemented. As shown, the system contains a Client System 501 and a Database System 520. The Client System 501 contains a Computer Processor 502, Storage media 503, Memory 504 and a Network Interface 508. Computer Processor 502 may be any processor capable of performing the functions described herein. The Client System 501 may connect to the Network 530 using the Network Interface 508. Furthermore, as will be understood by one of ordinary skill in the art, any computer system capable of performing the functions described herein may be used.

In the pictured embodiment, Memory 504 contains an Operating System 505 and a Client Application 506. Although Memory 504 is shown as a single entity, Memory 504 may include one or more memory devices having blocks of memory associated with physical addresses, such as random access memory (RAM), read only memory (ROM), flash memory or other types of volatile and/or non-volatile memory. The Client Application 506 is generally capable of generating database queries. Once the Client Application 506 generates a query, the query may be intercepted by DB Driver 507 and submitted over the Network 530 to an ESB (e.g., ESB System 510) for processing and execution. The Operating System 505 may be any operating system capable of performing the functions described herein.

The Database System 520 contains a Computer Processor 521, Storage media 523, Memory 524, and a Network Interface 529. Computer Processor 521 may be any processor capable of performing the functions described herein. In the pictured embodiment, Memory 524 contains an Operating System 525, a DBMS 526, a Database 527, and a RESTful Interface 528. Although Memory 524 is shown as a single entity, Memory 524 may include one or more memory devices having blocks of memory associated with physical addresses, such as random access memory (RAM), read only memory (ROM), flash memory or other types of volatile and/or non-volatile memory. The DBMS 526 interfaces with a Database 527. The Operating System 525 may be any operating system capable of performing the functions described herein. The RESTful Interface 528 allows HTTP Requests which enter the Database System through Network Interface 529 to be executed against the Database 527 and ensures that the incoming requests are properly formatted.

The ESB System 510 comprises an ESB Component 511. ESB System 510 is communicatively coupled to Network 530. ESB Component 511 receives SQL requests from Client System 501 and performs the transformations and processing discussed above. ESB Component 511 then sends a series of HTTP requests through Network 130 to Database System 520 to be executed against the Database 527. ESB Component 511 also receives the database responses from Database System 520 and processes and transforms them as needed to meet the original SQL request. Finally, ESB Component 511 sends one or more result sets through Network 530 back to Client System 501, where they are used by the Client Application 506.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, by an Enterprise Service Bus (ESB) component of an ESB system, from a first system, a database query formatted in a first format;
   generating a Structured Query Language (SQL) query plan for executing the database query, wherein the SQL query plan comprises a plurality of operations;
   generating an execution sequence based on the SQL query plan, by mapping each of the plurality of operations within the SQL query plan to be processed by either the ESB component a second system, wherein mapping the plurality of operations comprises:
upon determining that a first operation of the plurality of operations is a database operation used to insert data into a database, generating an HTTP request to carry out the first operation, wherein the HTTP request is a POST request;
mapping, to the second system, the first operation comprising the HTTP request; and
mapping, to the ESB component, a second operation comprising a data processing operation to be performed on a result of the database operation;
transmitting, based on the mapping, the HTTP request to a RESTful API provided by the second system, wherein the second system is configured to execute the HTTP request against the database;
receiving, by the ESB component, from the second system, a first set of results generated by executing the HTTP request against the database;
generating, by the ESB component, a set of query results for the database query by processing the received first set of results, comprising executing, based on the mapping, the data processing operation on the first set of results received from the second system; and
sending, to the first system, the set of query results.

2. The method of claim 1, wherein the first set of results comprises one or more JSON objects, and wherein generating the set of query results for the database query comprises mapping the one or more JSON objects to one or more SQL formatted set of query results.

3. The method of claim 1, wherein the data processing operation comprises one of (i) a join and (ii) a sort.

4. The method of claim 1, wherein the database query is received from a database driver that intercepts SQL queries on the first system and reroutes them, and wherein the set of query results comprises one or more JSON objects.

5. The method of claim 1, wherein generating the execution sequence further comprises assigning a respective in queue and a respective out queue for each of the first data processing operation and the HTTP request, and defining data transmission paths between the plurality of in queues and out queues.

6. The method of claim 1, the method further comprising converting the database query from a first database schema associated with a legacy database to a second database schema associated with the database of the second system, wherein the first and second database schemas are different.

7. A system, comprising:
a first system;
a second system; and
an enterprise service bus (ESB) system comprising one or more computer processors and configured perform an operation by operation of the one or more computer processors, the operation comprising:
receiving, by an ESB component of the ESB system, from the first system, a database query formatted in a first format;
generating a Structured Query Language (SQL) query plan for executing the database query, wherein the SQL query plan comprises a plurality of operations;
generating an execution sequence based on the SQL query plan, by mapping each of the plurality of operations within the SQL query plan to be processed by either the ESB component or a second system, wherein mapping the plurality of operations comprises:
upon determining that a first operation of the plurality of operations is a database operation used to insert data into a database, generating an HTTP request to carry out the first operation, wherein the HTTP request is a POST request;
mapping, to the second system, the first operation comprising the HTTP request; and
mapping, to the ESB component, a second operation comprising a data processing operation to be performed on a result of the database operation;
transmitting, based on the mapping, the HTTP request to a RESTful API provided by the second system, wherein the second system is configured to execute the HTTP request against the database;
receiving, by the ESB system, from the second system, a first set of results generated by executing the HTTP request against the database;
generating, by the ESB system, a set of query results for the database query by processing the received first set of results, comprising executing, based on the mapping, the data processing operation on the first set of results received from the second system; and
sending, to the first system, the set of query results.

8. The system of claim 7, wherein the first set of results comprises one or more JSON objects, and wherein generating the set of query results for the database query comprises mapping the one or more JSON objects to one or more SQL formatted set of query results.

9. The system of claim 7, wherein the data processing operation comprises a sort.

10. The system of claim 7, wherein the database query is received from a database driver that intercepts SQL queries on the first system and reroutes them, and wherein the set of query results comprises one or more JSON objects.

11. The system of claim 7, wherein generating the execution sequence further comprises assigning a respective in queue and a respective out queue for each of the first data processing operation and the HTTP request, and defining data transmission paths between the plurality of in queues and out queues.

12. The system of claim 7, the operation further comprising converting the database query from a first database schema associated with a legacy database to a second database schema associated with the database of the second system, wherein the first and second database schemas are different.

13. A computer program product for providing access to a remote database, the computer program product comprising:
a computer-readable storage medium containing computer-readable program code that, when executed by operation of one or more computer processors, performs an operation, comprising:
receiving, by an Enterprise Service Bus (ESB) component of an ESB system, from a first system, a database query formatted in a first format;
generating a Structured Query Language (SQL) query plan for executing the database query, wherein the SQL query plan comprises a plurality of operations;
generating an execution sequence based on the SQL query plan, by mapping each of the plurality of operations within the SQL query plan to be processed either the ESB component or a second system, wherein mapping the plurality of operations comprises:
upon determining that a first operation of the plurality of operations is a database operation used to insert data into a database, generating an HTTP request to carry out the first operation, wherein the HTTP request is a POST request;
mapping, to the second system, the first operation comprising the HTTP request; and
mapping, to the ESB component, a second operation comprising a data processing operation to be performed on a result of the database operation;
transmitting, based on the mapping, the HTTP request to a RESTful API provided by the second system, wherein the second system is configured to execute the HTTP request against the database;
receiving, by the ESB component, from the second system, a first set of results generated by executing the HTTP request against the database;
generating, by the ESB component, a set of query results for the database query by processing the received first set of results, comprising executing, based on the mapping, the data processing operation on the first set of results received from the second system; and sending, to the first system, the set of query results.

14. The computer program product of claim 13, wherein the database query is received from a database driver that intercepts SQL queries on the first system and reroutes them, and wherein the set of query results comprises one or more JSON objects.

15. The computer program product of claim 13, wherein generating the execution sequence further comprises assigning a respective in queue and a respective out queue for each of the first data processing operation and the first HTTP request, and defining data transmission paths between the plurality of in queues and out queues.

16. The computer program product of claim 13, the operation further comprising converting the database query from a first database schema associated with a legacy database to a second database schema associated with the database of the second system, wherein the first and second database schemas are different.

* * * * *